United States Patent
Holness et al.

(10) Patent No.: US 10,425,153 B2
(45) Date of Patent: *Sep. 24, 2019

(54) GENERALIZED SERVICE PROTECTION SYSTEMS AND METHODS

(71) Applicants: Marc Holness, Nepean (CA); Stephen Daniel Shew, Ottawa (CA); David Gilson, Honolulu, HI (US)

(72) Inventors: Marc Holness, Nepean (CA); Stephen Daniel Shew, Ottawa (CA); David Gilson, Honolulu, HI (US)

(73) Assignee: Ciena Corporation, Hanover, MD (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/990,137

(22) Filed: Jan. 7, 2016

(65) Prior Publication Data
US 2016/0134361 A1 May 12, 2016

Related U.S. Application Data

(63) Continuation of application No. 13/435,225, filed on Mar. 30, 2012, now Pat. No. 9,264,254.

(51) Int. Cl.
| | |
|---|---|
| *H04B 10/03* | (2013.01) |
| *H04L 12/43* | (2006.01) |
| *H04L 12/931* | (2013.01) |
| *H04L 12/707* | (2013.01) |
| *H04Q 11/00* | (2006.01) |
| *H04B 10/032* | (2013.01) |
| *H04L 12/437* | (2006.01) |
| *H04J 3/16* | (2006.01) |
| *H04L 12/42* | (2006.01) |
| *H04L 12/64* | (2006.01) |

(52) U.S. Cl.
CPC ............ *H04B 10/032* (2013.01); *H04J 3/167* (2013.01); *H04L 12/437* (2013.01); *H04L 45/22* (2013.01); *H04L 49/00* (2013.01); *H04Q 11/0066* (2013.01); *H04L 12/42* (2013.01); *H04L 2012/6437* (2013.01); *H04Q 2011/0081* (2013.01)

(58) Field of Classification Search
CPC ....... H04L 49/00; H04L 12/437; H04L 12/26; H04L 45/22; H04B 10/032; H04B 10/08
See application file for complete search history.

(56) References Cited

U.S. PATENT DOCUMENTS

| | | | |
|---|---|---|---|
| 7,190,896 B1 * | 3/2007 | Wang | ................. H04Q 11/0066 398/30 |
| 7,590,123 B2 | 9/2009 | Asati et al. | |
| 8,018,841 B2 | 9/2011 | Holness et al. | |

(Continued)

*Primary Examiner* — Xavier Szewai Wong
(74) *Attorney, Agent, or Firm* — Clements Bernard Walker PLLC; Christopher L. Bernard; Lawrence A. Baratta, Jr.

(57) ABSTRACT

Systems and methods for ring protection switching in a network based on selectively blocking and unblocking a port include forwarding traffic via the port over a data channel that utilizes a first service identifier, wherein the data channel is routed in the network along a closed loop; and selectively blocking and unblocking traffic on the port to provide the ring protection switching over the closed loop, wherein the selectively blocking and unblocking is performed based on a management channel that utilizes a second service identifier that is a different type from the first service identifier.

20 Claims, 17 Drawing Sheets

(56) References Cited

U.S. PATENT DOCUMENTS

| | | | |
|---|---|---|---|
| 8,509,061 B2* | 8/2013 | Holness | H04L 12/437 370/222 |
| 9,264,254 B2* | 2/2016 | Holness | H04L 49/00 |
| 2005/0002329 A1* | 1/2005 | Luft | H04J 3/085 370/222 |
| 2006/0165002 A1* | 7/2006 | Hicks | H04L 12/437 370/248 |
| 2006/0257143 A1* | 11/2006 | Cavazzoni | H04J 14/0227 398/49 |
| 2009/0168647 A1 | 7/2009 | Holness et al. | |
| 2009/0168671 A1 | 7/2009 | Holness et al. | |
| 2009/0316571 A1 | 12/2009 | Rose et al. | |
| 2010/0094981 A1 | 4/2010 | Cordray et al. | |
| 2010/0135154 A1 | 6/2010 | Cheung et al. | |
| 2010/0165834 A1 | 7/2010 | Holness et al. | |
| 2010/0165883 A1 | 7/2010 | Holness et al. | |
| 2010/0260196 A1 | 10/2010 | Holness et al. | |
| 2010/0284413 A1 | 11/2010 | Abdullah et al. | |
| 2010/0287405 A1 | 11/2010 | Soon | |
| 2010/0309821 A1 | 12/2010 | Sergeev | |
| 2010/0322263 A1 | 12/2010 | Allan et al. | |
| 2011/0007628 A1 | 1/2011 | Tochio | |
| 2011/0063971 A1 | 3/2011 | Tochio | |
| 2011/0075554 A1 | 3/2011 | Holness | |
| 2011/0075573 A1 | 3/2011 | Saigusa et al. | |
| 2011/0075584 A1 | 3/2011 | Teramoto | |
| 2012/0106360 A1* | 5/2012 | Sajassi | H04L 12/437 370/245 |
| 2012/0155246 A1* | 6/2012 | Wang | H04L 12/437 370/217 |
| 2012/0195319 A1 | 8/2012 | Bragg et al. | |
| 2012/0224471 A1 | 9/2012 | Vinod et al. | |

\* cited by examiner

Channel unblocking is provided by allowing traffic to ingress the "forwarder" or egress from the "forwarder" (associated with the virtual ring).

Channel blocking is provided by preventing traffic from ingress to the "forwarder" or egress from the "forwarder" (associated with the virtual ring).

GENERALIZED SERVICE PROTECTION SYSTEMS AND METHODS

CROSS-REFERENCE TO RELATED APPLICATION(S)

The present patent/application is a continuation of U.S. patent application Ser. No. 13/435,225, filed Mar. 30, 2012, and entitled "GENERALIZED SERVICE PROTECTION SYSTEMS AND METHODS," the contents of which are incorporated by reference.

FIELD OF THE INVENTION

Generally, the field of art of the present disclosure pertains to networking systems and methods, and more particularly, to generalized service protection systems and methods.

BACKGROUND OF THE INVENTION

Conventionally, G.8032 Ethernet Ring Protection is an Ethernet shared ring protection technology analogous to Synchronous Optical Network (SONET) and Synchronous Digital Hierarchy (SDH) rings. Of note, G.8032 is defined in ITU-T G.8032 Ethernet Ring Protection Switching (March 2010), ITU-T G.8032 Amendment 1 (June 2010), and ITU-T G.8032 Amendment 2 (February 2011), the contents of each is incorporated by reference herein. With SONET/SDH rings, timeslots are used as a data plane forwarding identifier, and with G.8032, Ethernet frame Virtual Local Area Network (VLAN) Identifier (VID) and Destination Media Access Control Address (MAC DA) are used as the data plane identifier. As specified, the G.8032 protocol is applicable to bearer traffic that is based on the VID service space identification. Consequently, G.8032, as specified, can only be applied to IEEE 802.1Q Media Access Control (MAC) Bridges and Virtual Bridged Local Area Networks (2003, 2005, 2008, and 2011) (or amendment [IEEE 802.1ad Provider Bridges (2005), 802.1ah Provider Backbone Bridges (2008)]) bearer plane technologies. The contents of IEEE 802.1Q, 802.1ad, and 802.1ah are each incorporated by reference herein. Disadvantageously, G.8032 being only applicable to IEEE 802.1Q or amendments thereof is limiting the application of protection switching to other bearer traffic technologies.

BRIEF SUMMARY OF THE INVENTION

In an exemplary embodiment, a method for ring protection switching in a network based on selectively blocking and unblocking a port includes forwarding traffic via the port over a data channel that utilizes a first service identifier, wherein the data channel is routed in the network along a closed loop; and selectively blocking and unblocking traffic on the port to provide the ring protection switching over the closed loop, wherein the selectively blocking and unblocking is performed based on a management channel that utilizes a second service identifier that is a different type from the first service identifier. The forwarding traffic and the selectively blocking and unblocking traffic can be independent actions with associated entities configured to perform the forwarding traffic and the selectively blocking and unblocking traffic being decoupled from one another. The first service identifier is not a Virtual Local Area Network (VLAN) Identifier (VID) and a Destination Media Access Control (MAC DA). The second service identifier can be an Ethernet service identifier, and the first service identifier is not an Ethernet service identifier. The first service identifier can be a Time Division Multiplexing (TDM) bearer traffic identifier, and wherein the selectively blocking and unblocking traffic is performed in a switch fabric. The data channel can be a wavelength, and wherein the selectively blocking and unblocking traffic is performed by an optical routing device. The selectively blocking and unblocking traffic is performed responsive to detecting a fault in the management channel.

In another exemplary embodiment, an apparatus configured to perform ring protection switching in a network based on selectively blocking and unblocking a port includes circuitry adapted to forward traffic via the port over a data channel that utilizes a first service identifier, wherein the data channel is routed in the network along a closed loop; and circuitry adapted to selectively block and unblock traffic on the port to provide the ring protection switching over the closed loop, wherein the traffic is selectively blocked and unblocked based on a management channel that utilizes a second service identifier that is a different type from the first service identifier. The forward of the traffic and the block and unblock of the traffic are independent actions with associated entities configured to perform the independent actions being decoupled from one another. The first service identifier is not a Virtual Local Area Network (VLAN) Identifier (VID) and a Destination Media Access Control (MAC DA). The second service identifier can be an Ethernet service identifier, and the first service identifier is not an Ethernet service identifier. The first service identifier can be a Time Division Multiplexing (TDM) bearer traffic identifier, and wherein the traffic is selectively blocked and unblocked in a switch fabric. The data channel can be a wavelength, and wherein the traffic is selectively blocked and unblocked by an optical routing device. The traffic is selectively blocked and unblocked responsive to detecting a fault in the management channel.

In a further exemplary embodiment, a node configured to perform ring protection switching in a network based on selectively blocking and unblocking a port includes at least one port adapted to forward traffic over a data channel that utilizes a first service identifier, wherein the data channel is routed in the network along a closed loop; and a device adapted to selectively block and unblock traffic on the port to provide the ring protection switching over the closed loop, wherein the traffic is selectively blocked and unblocked based on a management channel that utilizes a second service identifier that is a different type from the first service identifier. The forward of the traffic and the block and unblock of the traffic are independent actions with associated entities configured to perform the independent actions being decoupled from one another. The first service identifier is not a Virtual Local Area Network (VLAN) Identifier (VID) and a Destination Media Access Control (MAC DA). The second service identifier can be an Ethernet service identifier, and the first service identifier is not an Ethernet service identifier. The first service identifier can be a Time Division Multiplexing (TDM) bearer traffic identifier, and wherein the traffic is selectively blocked and unblocked in a switch fabric. The data channel can be a wavelength, and wherein the traffic is selectively blocked and unblocked by an optical routing device.

In an exemplary embodiment, a node includes a first port configured to be selectively blocked and unblocked; a second port configured to be selectively blocked and unblocked; a forwarder between the first port and the second port; a management channel between the first port and the second port, wherein the selective blocking and unblocking of the first port and the second port is based on the management channel; and a data channel between the first port and the second port, wherein the data channel utilizes an arbitrary service identifier. The forwarder can include circuitry configured to forward bearer traffic on the data channel based on Ethernet forwarding logic. The forwarder can include circuitry or an optical device configured to forward bearer traffic on the data channel utilizing a non-learning forwarding paradigm. The arbitrary service identifier can be different from a service identifier associated with the management channel. The arbitrary service identifier can include any of Provider Backbone Bridging Backbone Service Instance Identifier (PBB I-SID), Ethernet Virtual Local Area Network (VLAN) identifier and/or tag priority bits, Multiprotocol Label Switching (MPLS) label identifier, Internet Protocol (IP) Differentiated Services Code Point (DSCP), EtherType value, Generic Framing Protocol (GFP) protocol identifier (PID), Time Division Multiplexing (TDM) bearer traffic identifiers, Optical Transport Network (OTN) service identifiers, wavelength identifiers, and a combination thereof.

The selective blocking and unblocking of the first port and the second port can be based on the arbitrary service identifier. The forwarder can be configured to forward traffic on both the management channel and the data channel based on a plurality of arbitrary service identifiers. The forwarder can be configured with a virtual forwarding instance per arbitrary service identifier. The virtual forwarding instance can conform to an IEEE 802.1Q forwarding process. The node can further include circuitry to detect a failure associated with one of the plurality of arbitrary service identifiers based on monitoring the management channel; wherein the virtual forwarding instance is configured to remove forwarding entries associated with the one of the plurality of arbitrary service identifiers upon detection of the failure. The virtual forwarding instance can be configured to relearn forwarding entries associated with the one of the plurality of arbitrary service identifiers upon the removal of the forwarding entries. The forwarder can be configured with a non-learning based forwarding system that forwards data between the first port and the second port based on predetermined rules. The forwarder can include one of an optical routing device, an electrical Time Division Multiplexing (TDM) switch fabric and a packet switch where learning is disabled effectively resulting in all received frames being forwarded out all associated egress ports. The data channel and the management channel can be separated therebetween into different instances of a same service identifier name space. The data channel and the management channel can be separated therebetween into different service identifier name spaces. The node can operate Ethernet Ring Protection Switching with the data channel utilizing a different service identifier than the management channel.

In another exemplary embodiment, a network includes a plurality of interconnected nodes forming one of a logical ring and a physical ring; a first virtual ring on the plurality of interconnected nodes, wherein the first virtual ring includes a bearer channel and a ring automatic protection switching (R-APS) channel, and wherein the bearer channel and the R-APS channel each use a different service identifier space; and a first selectively enabled channel block on the first virtual ring; wherein each of the plurality of interconnected nodes include a forwarding mechanism, and wherein the forwarding mechanism is independent of the first selectively enabled channel block.

In yet another exemplary embodiment, a method includes operating a ring with Ring Protection Switching including a forwarding mechanism and a blocking mechanism that are independent and decoupled entities therebetween, wherein the ring includes a management channel and a data channel that each utilize an arbitrary service identifier; detecting a failure affect a ring span; installing channel blocks adjacent to the failure; transmitting fault indication messages on the ring; upon receiving the fault indication messages, removing any channel blocks on the ring besides the channel blocks adjacent to the failure.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, generalized service protection systems and methods are disclosed enabling aspects of the G.8032 control protection protocol to be applied to other bearer plane technologies, such as, but not limited to, Multiprotocol Label Switching (MPLS), Optical Transport Network (OTN), Time Division Multiplexing (TDM), Internet Protocol (IP), etc. That is, the generalized service protection systems and methods support variants to the G.8032 protocol for service identifiers in an arbitrary address space (e.g., MPLS labels, IP Differentiated Services Code Point (DSCP), EtherTypes, OTN service identifiers, TDM bearer traffic identifiers, etc.). The generalized service protection systems and methods allow systems and methods similar to the G.8032 protocol to be applied to bearer traffic based on OTN traffic, SONET/SDH traffic, MPLS traffic, IP traffic, etc. That is, generally any traffic based on non-VID space identifiers. Various protection switching performance attributes of G.8032 (e.g., sub-50 ms protection switching) applied to these arbitrary bearer traffic types are retained. Thus, the generalized service protection systems and methods extend/abstract the G.8032 protocol to provide blocking/unblocking of bearer traffic on a ring (i.e., physical or logical) using an arbitrary service address space.

Figure 1:
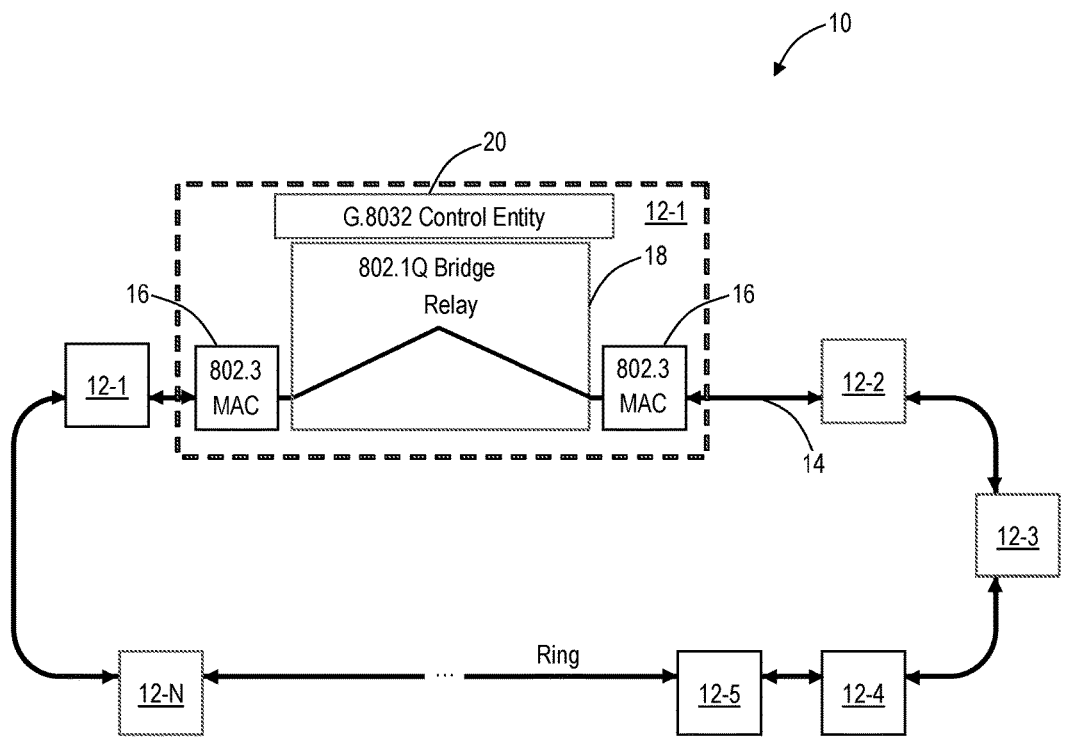
FIG. 1 is a network diagram of a network of nodes for illustration of Ethernet Ring Protection Switching, such as G.8032.

Referring to FIG. 1, in an exemplary embodiment, a network diagram illustrates a network 10 of nodes 12 (labeled 12-1 to 12-N) for illustration of Ethernet Ring Protection Switching, such as G.8032. For Ethernet Ring Protection Switching, the nodes 12 can be either logically or physically arranged in a ring. That is, Ethernet Ring Protection Switching requires a closed loop. In an exemplary embodiment, the nodes 12 can be physically interconnected to one another via links 14 in a ring. In another exemplary embodiment, the nodes 12 can be physically connected via links 14 in a mesh network with the particular nodes 12-1 to 12-N selected to form a closed loop network topology in the mesh network. In the example of FIG. 1, the node 12-1 is illustrated in detail to show various components of the nodes 12. Specifically, each node 12 can include a pair of MAC interfaces 16, a bridge relay 18, and a control entity 20. The MAC interfaces 16 can be compliant to IEEE 802.3, and generally provide Layer 2 physical interfaces for the network 10. The bridge relay 18 can be compliant to IEEE 802.1Q, and the control entity 20 can be compliant to G.8032. The control entity 20 is used to allow the nodes 12 to exchange forwarding information and other control information therebetween, as well as to control how a data plane handles the data on the network 10. For example, the control entity 20 enables the nodes 12 to participate in a spanning tree. Of note, the MAC interfaces 16, the bridge relay 18, and the control entity 20 can include hardware, software, and/or firmware for implementing various functions described herein. That is, the MAC interfaces 16, the bridge relay 18, and the control entity 20 cooperatively operate for implementation of Ethernet Ring Protection Switching on the network 10.

Ethernet Ring Protection Switching forms an active ring topology in the network 10 by dynamic and managed the configuration of forwarding table entries at each of the nodes 12, such as through the control entity 20 and/or the bridge relay 18. Ethernet Ring Protection Switching includes a control protocol (e.g., G.8032 ring automatic protection switching (R-APS) Protocol Data Units (PDUs)). The PDUs are persistently transmitted over the network 10 to convey ring status/state and control ring port blocking/unblocking to facilitate loop prevention and protection switching thereon. From a standards perspective, IEEE 802.3 MAC can be used at Layer 2, IEEE 802.1Q and amendment (e.g., 802.1ad, 802.1ah) for bridging of traffic, and Operations, Administration, and Maintenance (OAM) frames (e.g., IEEE 802.1ag "Connectivity Fault Management" (September 2007), ITU-T Y.1731, etc.) to control the network 10. Each of the nodes 12 forwards traffic based upon standard 802.1Q forwarding logic (based on VID/MAC) that is (somewhat) independent of protection switching mechanism. Specifically, this forwarding can be based on VLAN tags. This forwarding can be performed by the bridge relay 18.

By virtue of the nodes 12 being interconnected in a closed loop architecture, the nodes 12 can be allowed to collectively run a separate control plane to control how data is passed between the nodes 12 on the ring. The control plane on the closed loop selects one of the nodes 12 to be a root node to provide for blocking of traffic flowing on the ring. This prevents traffic from endlessly looping on the ring. Additionally, the control plane provides for failure detection on the closed loop, notification of the failure to the nodes 12 on the closed loop, and how connectivity can be restored to enable the closed loop to recover from failure. One aspect of the control protocol is that, upon failure in the closed loop, a fault indication message is transmitted on the ring. The fault indication message, amongst other things, causes the bridging nodes 12 on the ring to flush their forwarding databases associated with the ring so that the nodes can re-learn MAC addresses on the ring. In the network 10, protection switching and loop prevention are supported via port blocking/unblocking functions and active ring topology discovery/rediscovery functions. Note, active ring topology discovery/rediscovery may be supported by forwarding database learning, forwarding, and entry cleansing procedures. The network 10 also includes monitoring of the ring server layer (e.g., physical layer) to discovery Signal Failure (SF) conditions to trigger protection switching providing protection and recovery switching within 50 ms.

Figure 2A:
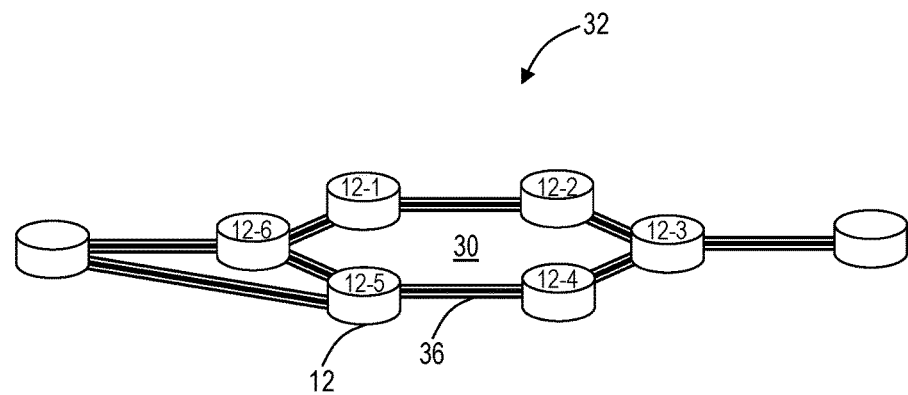
FIGS. 2A and 2B are network diagrams of a logical ring of nodes in a network and an associated virtual ring thereon.
Figure 2B:
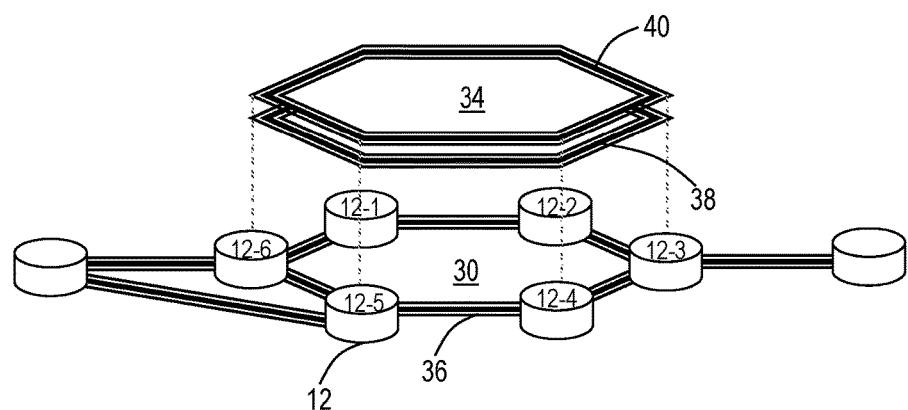

Referring to FIGS. 2A and 2B, in an exemplary embodiment, network diagrams illustrate a logical ring 30 of nodes 12-1 through 12-6 in a network 32 and an associated virtual ring 34 thereon. A ring is a logical construct that forms a closed loop over a physical network infrastructure, i.e. any network that provides resiliency having diversely routed paths between two endpoints, thus forming a closed loop. In FIG. 1, the nodes 12 are in a ring configuration. Further, the ring may be agnostic to the client and server layer. The logical ring 30 utilizes a forwarding paradigm of service/client traffic over the ring. The logical ring 30 is a closed loop created over a physical network infrastructure. The connections between adjacent ring nodes 12 (i.e., ring spans 36) provide a point-to-point connection between the adjacent ring nodes 12. Note, the ring spans 36 associated with the ring 30 need not be the same bandwidth nor server layer technology. The virtual ring 34 includes two channels 38, 40 and is associated with the logical ring 30. The channel 38 can include a Ring Automatic Protection Switching (R-APS) channel used for transport of ring control PDUs over the rings 30, 34, and the channel 40 can include a service data channel (also referred to as a bearer channel) used for transport of client data traffic over the rings 30, 34. That is, the channel 38 is used for management and can be referred to as a management channel, and the channel 40 is used for data and can be referred to as a data channel.

Figure 3A:
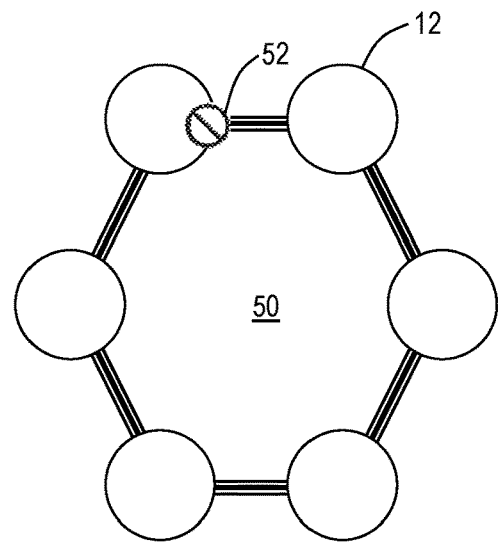
FIGS. 3A and 3B are network diagrams of a ring of nodes depicting channel blocks thereon.
Figure 3B:
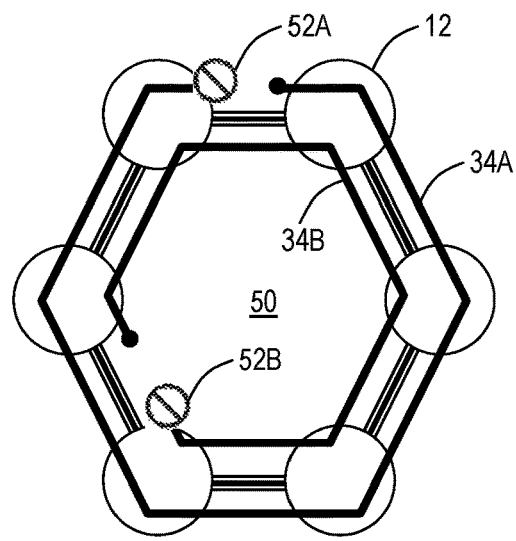

Referring to FIGS. 3A and 3B, in an exemplary embodiment, network diagrams illustrate a ring 50 of nodes 12 depicting channel blocks 52. In G.8032, the channel block 52 prevents service traffic from being relayed/forwarded between [ring or client] ports. Note, the channel block 52 operates on the channels 38, 40 from FIG. 2B, for example. The channel block 52 function prevents traffic from being forwarded by the Rx ring port, e.g., by the MAC interfaces 16. However, the channel block 52 does not prevent traffic from being received by Higher Layer Entities (e.g., the control entity 20) on that node 12. The following channel block 52 rules should be applied, namely 1) each channel must have at least a [single] channel block 52 installed (at all times), and 2) the location of the "provisioned" channel block 52 (associated with the Ring Protection Link) can be manually determined or auto-discovered by a channel block discovery protocol. FIG. 3B illustrates two virtual rings 34A, 34B on the ring 50 in an overlapping fashion. That is, each of the virtual rings 34A, 34B has a separate service identifier and channel blocks 52A, 52B. Note, the channel blocks 52A, 52B could be collocated. In operation, a service data channel 40 for each of the virtual rings 34A, 34B transports a collection of [client] traffic flows over the ring 50 that share a provisioned channel block 52A, 52B. Note, it is assumed that each client traffic flow has a unique identifier associated with it.

Figure 4:
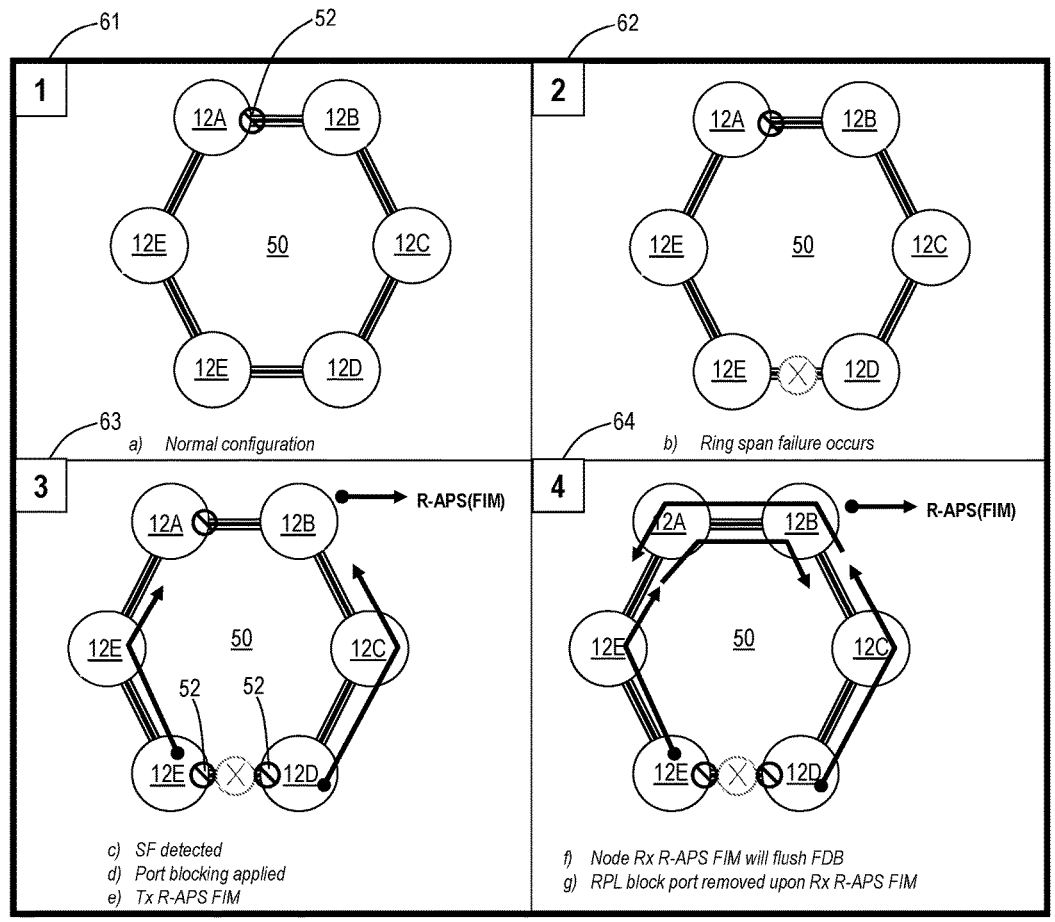
FIG. 4 is a network diagram of the ring of FIGS. 3A and 3B showing a failure sequence using G.8032 Ethernet Ring Protection Switching.

Referring to FIG. 4, in an exemplary embodiment, the ring 50 with nodes 12 is illustrated showing a failure sequence using G.8032 Ethernet Ring Protection Switching. At a first point 61 in FIG. 4, the ring 50 is operating under a normal configuration, i.e., no failures. In this example, the channel block 52 is at the node 12A facing the node 12B. At a point 62, a failure occurs on a ring span between the nodes 12E, 12D. At a point 63, a signal failure (SF) is detected on the ring, port blocking is applied at the nodes 12E, 12D via channel blocks 52, and R-APS Failure Indication Messages (FIM) are transmitted over the management channel. At a point 64, each of the nodes 12 will receive the R-APS FIM and flush their current Forwarding Database (FDB) and the channel block 52 will be removed at the node 12A upon receipt of the R-APS FIM. The FDB includes information which contains the routing configuration from the point of view of the current node 12. Under G.8032, general protocol guidelines used to support protection switching within 50 ms are 1) Time for a R-APS message to circulate an entire ring (i.e., ring circumference and nodal transit delays) should be 10 ms, 2) Time taken to install channel blocks should be 15 ms, 3) Time taken to cleanse stale entries found in the FDB associated with Ring should be 10 ms, and 4) Time taken to remove channel blocks should be 15 ms.

Figure 5:
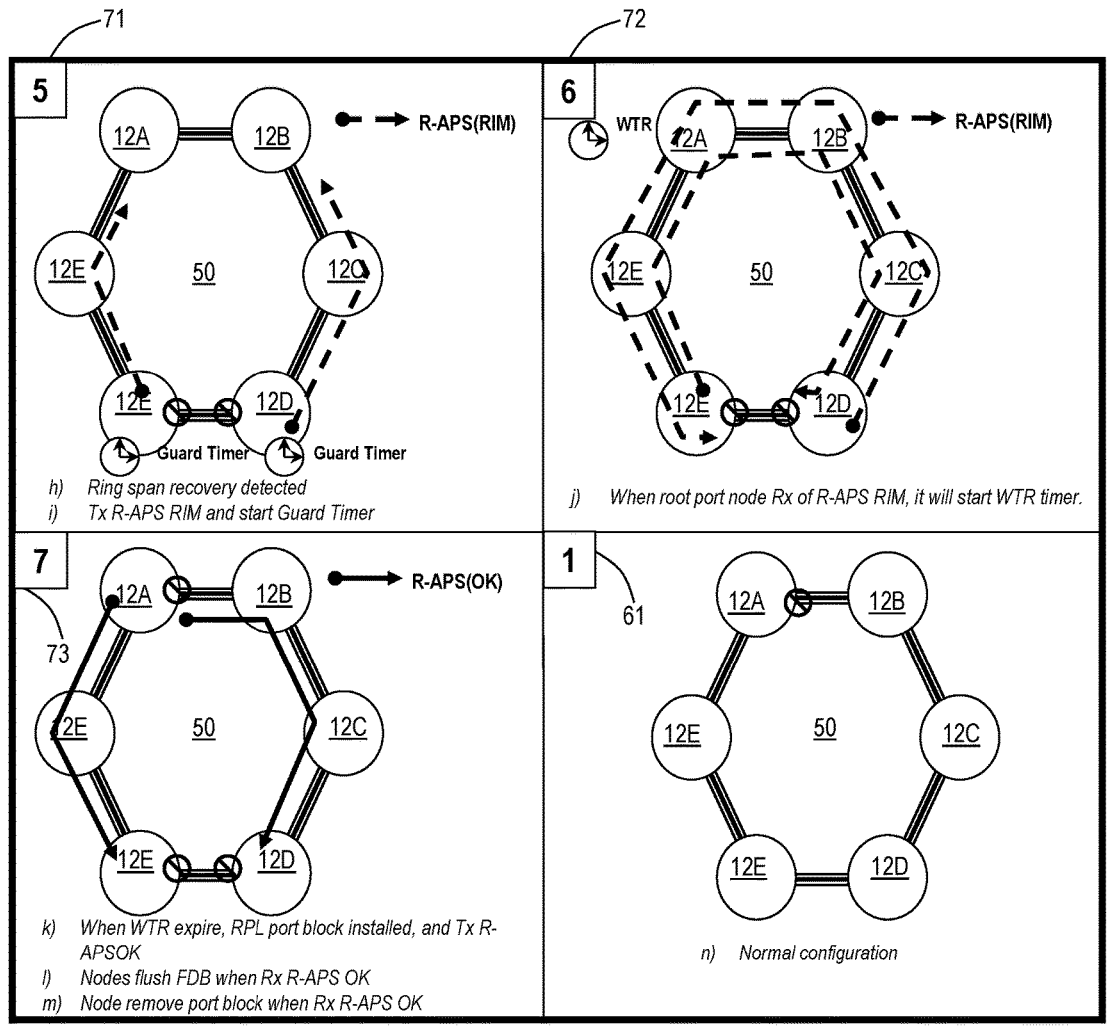
FIG. 5 is a network diagram of the ring of FIGS. 3A and 3B showing a recovery sequence using G.8032 Ethernet Ring Protection Switching.

Referring to FIG. 5, in an exemplary embodiment, the ring 50 is illustrated showing a recovery sequence using G.8032 Ethernet Ring Protection Switching on the nodes 12. The recovery sequence includes a recovery from the failure illustrated in FIG. 4 between the nodes 12D, 12E. At a point 71, a ring span recovery is detected between the nodes 12D, 12E and R-APS Recovery Indication Messages (RIM) are transmitted along with guard timers started at the nodes 12D, 12E. At a point 72, when a root port node receives the R-APS RIM, a wait-to-restore (WTR) timer is started. At a point 73, when the WTR expires, a Ring Protection Link (RPL) port block is installed at the node 12A and R-APS OK messages are transmitted. Also, each of the nodes 12 flushes their FDB when the R-APS OK messages are received as well as removing port block such as at the nodes 12D, 12E when the R-APS OK messages are received. Finally, the ring 50 is back in a normal operating condition, i.e., back to the point 61.

Figure 6A:
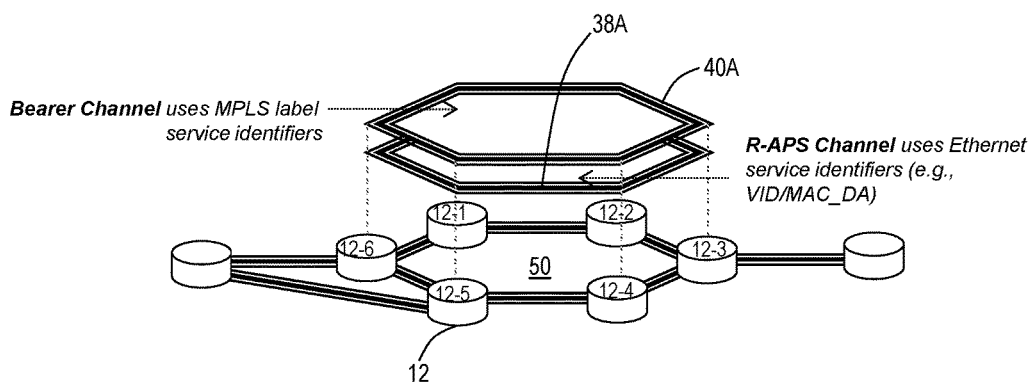
FIGS. 6A and 6B are network diagrams of the ring of FIGS. 3A and 3B showing G.8032 like Ring Protection with a generalized/arbitrary identification space and forwarding based on IEEE 802.1Q bridging.
Figure 6B:
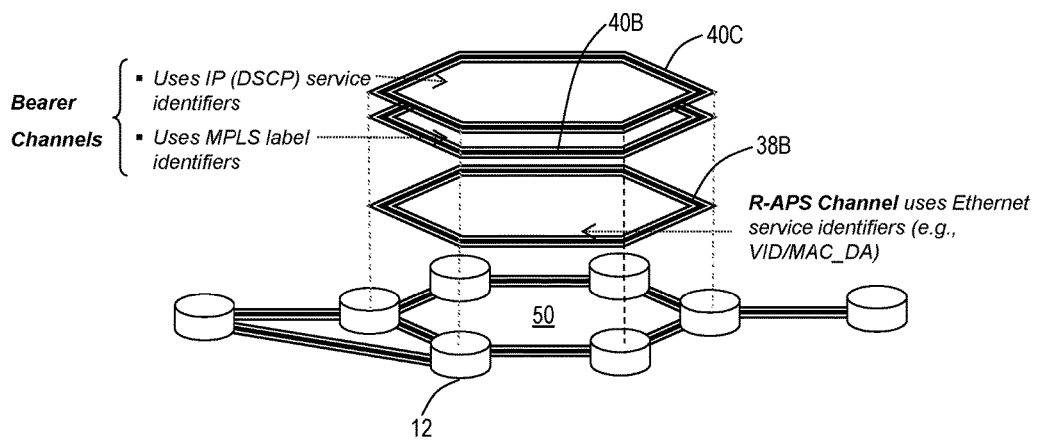

Referring to FIGS. 6A and 6B, in an exemplary embodiment, the ring 50 is illustrated with G.8032 like Ring Protection with a generalized/arbitrary identification space and forwarding based on IEEE 802.1Q bridging. In FIG. 6A, the ring 50 includes virtual channels 38A, 40A with the channel 38A being a R-APS channel using Ethernet service identifiers (e.g., VID/MAC DA) and the channel 40A being a bearer channel using MPLS label service identifiers. In FIG. 6B, the ring 50 includes virtual channels 38B, 40B, 40C with the channel 38B being a R-APS channel using Ethernet service identifiers (e.g., VID/MAC DA), the channel 40B being a bearer channel using MPLS label service identifiers, and the channel 40C being a bearer channel using IP (DSCP) service identifiers. The R-APS protocol for bearer channels 40B and 40C is run on management channel 38B. Thus, in the examples of FIGS. 6A and 6B, the R-APS channels 38A, 38B use a different service identifier space than the bearer channels 40A, 40B, 40C. Also, note the channels 40A, 40B, 40C are illustrated with MPLS label service identifiers and IP (DSCP) service identifiers for illustration purposes, and other service identifiers are also contemplated by the generalized service protection systems and methods.

In this exemplary embodiment of a generalized/arbitrary identification space and forwarding based on IEEE 802.1Q bridging, the G.8032 protocol can be abstracted to support the transport and protection of service traffic with an arbitrary service identification space. The following abstractions/modifications are necessary for the generalized service protection systems and methods. First, service and control flows being transported over the ring 50 can be identified based upon a unique identifier within the packet. Exemplary unique identifiers can include Provider Backbone Bridging Backbone Service Instance Identifier (PBB I-SID), Ethernet VLAN identifier and/or tag priority bits, MPLS label identifier, IP DSCP, EtherType value, Generic Framing Protocol (GFP) protocol identifier (PID), a combination of the aforementioned, and the like. Second, the generalized service protection systems and methods support blocking/unblocking of bearer and R-APS traffic channels 38A, 38B, 40A, 40B, 40C based upon the respective service identifier.

Third, the generalized service protection systems and methods support forwarding of bearer and R-APS traffic over the ring 50 based upon service identifier that is possibly different from the service identifier used for blocking/unblocking. For example, a virtual forwarding instance (VFI) is created per service identifier (grouping), and each VFI conforms to an IEEE 802.1Q forwarding process. Fourth, the generalized service protection systems and methods support cleansing/removal of forwarding entries associated with a VFI associated with the service identifier. Fifth, the generalized service protection systems and methods support initiation of relearning of forwarding entries associated with a VFI associated with the service identifier. Sixth, the generalized service protection systems and methods support separation of the bearer and R-APS traffic into different instances of the same service identifier name space, or different service identifier name spaces.

Figure 7:
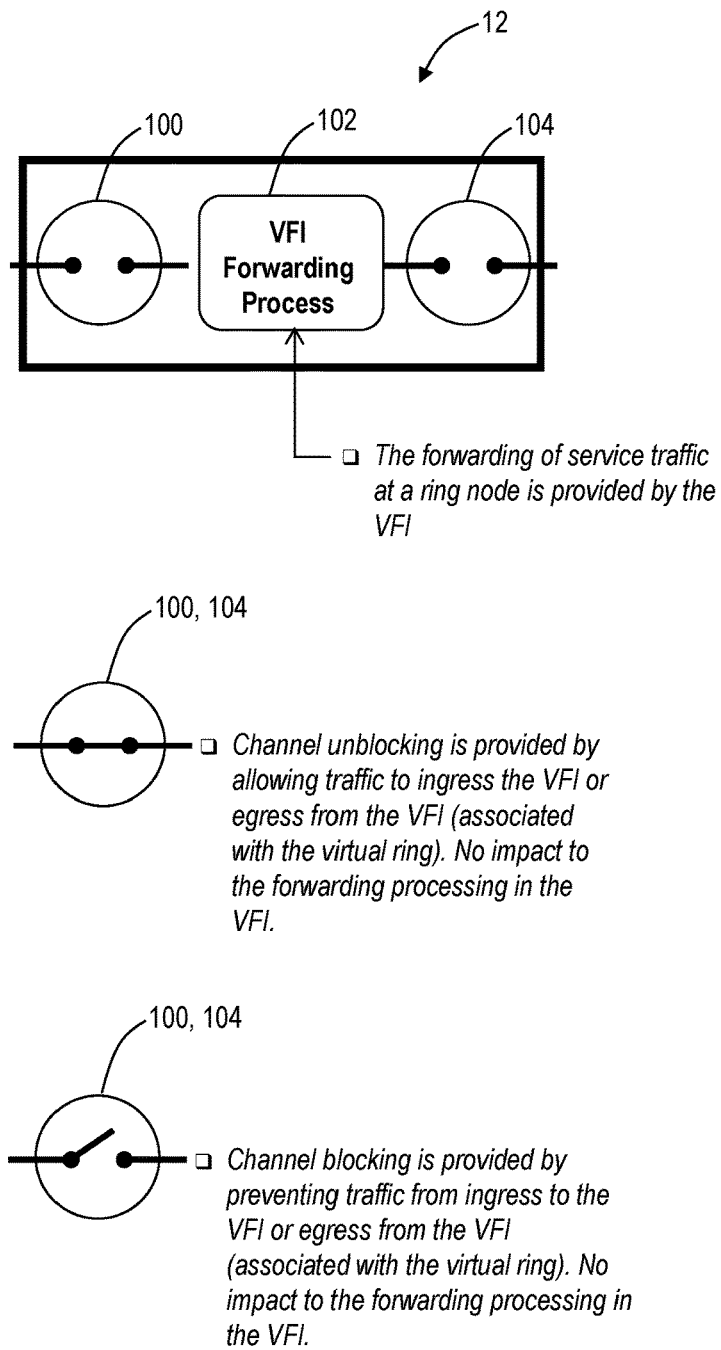
FIG. 7 is a block diagram of functions associated with the ring node for the generalized/arbitrary identification space and forwarding based on IEEE 802.1Q bridging.

Referring to FIG. 7, in an exemplary embodiment, block diagrams illustrate functions associated with the ring node 12 for the generalized/arbitrary identification space and forwarding based on IEEE 802.1Q bridging. In this exemplary embodiment, the forwarding paradigm used and the blocking that is done are independent actions and entities and are decoupled. Each of the nodes 12 can be represented by a first port 100, a forwarding process 102, and a second port 104. The ports 100, 104 ingress and egress frames on the ring 50, and the forwarding process 102 communicatively couples the ports 100, 104 therebetween. While illustrated conceptually, those of ordinary skill in the art will recognize the ports 100, 104 and the forwarding process 102 each includes hardware, software, and/or firmware for implementing their associated functions. The forwarding process 102 is configured to forward service traffic on the ring 50, such as over the channels 40A, 40B, 40C, using the VFI. Each of the ports 100, 104 includes the channel block 52 functionality described herein. Channel unblocking is provided by allowing traffic to ingress the forwarding process 102 or egress from the forwarding process 102 (associated with the virtual ring). Channel blocking is provided by preventing traffic from ingress to the forwarding process 102 or egress from the forwarding process 102 (associated with the virtual ring). Of note, the blocking/unblocking has no impact to the forwarding process 102.

Figure 8:
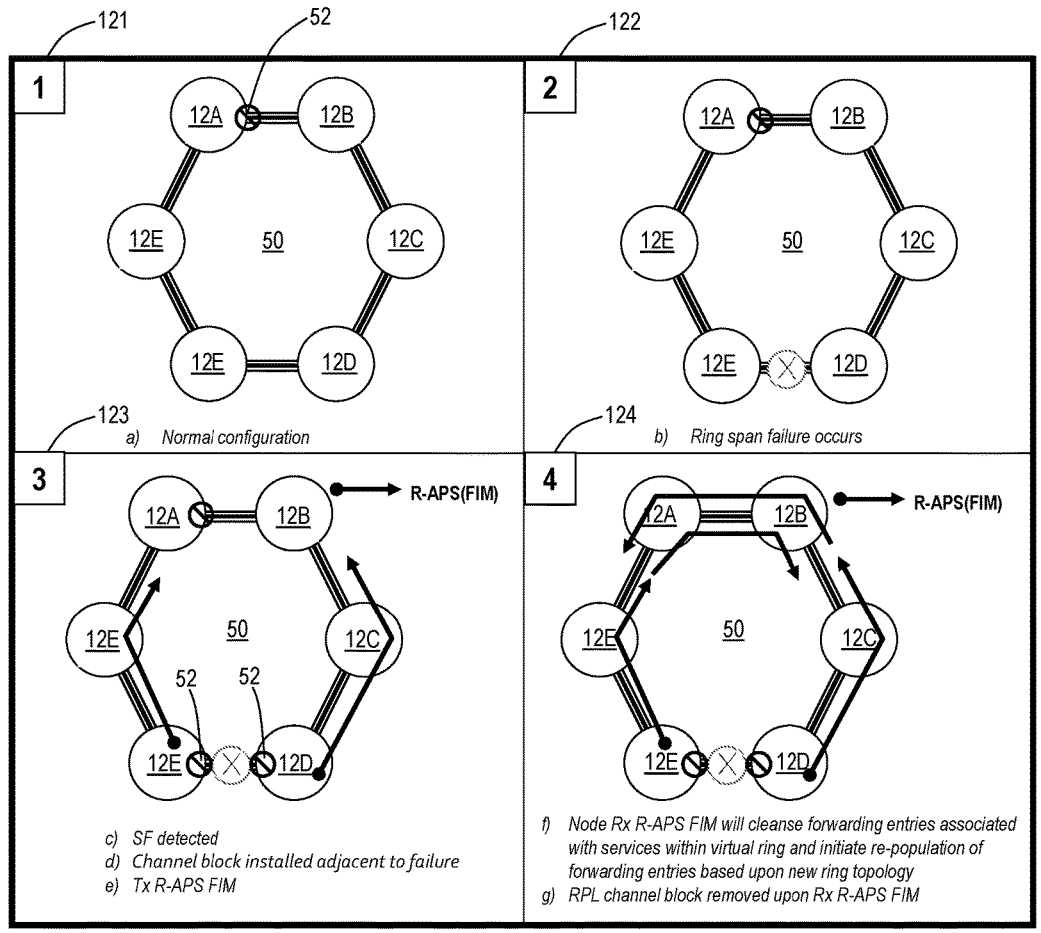
FIG. 8 is a network diagram of the ring of FIGS. 3A and 3B showing a failure sequence using G.8032 Ethernet Ring Protection Switching with the generalized/arbitrary identification space and forwarding based on IEEE 802.1Q bridging.

Referring to FIG. 8, in an exemplary embodiment, the ring 50 with nodes 12 is illustrated showing a failure sequence using G.8032 Ethernet Ring Protection Switching with the generalized/arbitrary identification space and forwarding based on IEEE 802.1Q bridging. At a first point 121 in FIG. 8, the ring 50 is operating under a normal configuration, i.e. no failures. In this example, the channel block 52 is at the node 12A facing the node 12B. As discussed herein, in the exemplary embodiment, the traffic is routed on bearer channels based on a first service identifier, and the R-APS channel on a second service identifier. Blocking occurs on both channels at the same location on the ring. At a point 122, a failure occurs on a ring span between the nodes 12E, 12D, detected via the R-APS channel. At a point 123, a signal failure (SF) is detected on the ring, a channel block is installed adjacent to the failure between the nodes 12E, 12D, and R-APS Failure Indication Messages (FIM) are transmitted from the nodes 12E, 12D. At a point 124, each of the nodes 12 will receive the R-APS FIM and cleanse their forwarding entries associated with the services within the virtual ring, and initiate repopulation of the forwarding entries based upon a new ring topology. Specifically, the node 12A is configured to remove its channel block upon receipt of the R-APS FIM. The forwarding entries are based on the forwarding process 102 at each of the nodes. Under G.8032, general protocol guidelines used to support protection switching within 50 ms are 1) Time for a R-APS message to circulate an entire ring (i.e., ring circumference and nodal transit delays) should be 10 ms, 2) Time taken to install channel blocks should be ≤15 ms, 3) Time taken to cleanse stale entries found in the FDB associated with Ring should be ≤10 ms, and 4) Time taken to remove channel blocks should be 15 ms.

Figure 9:
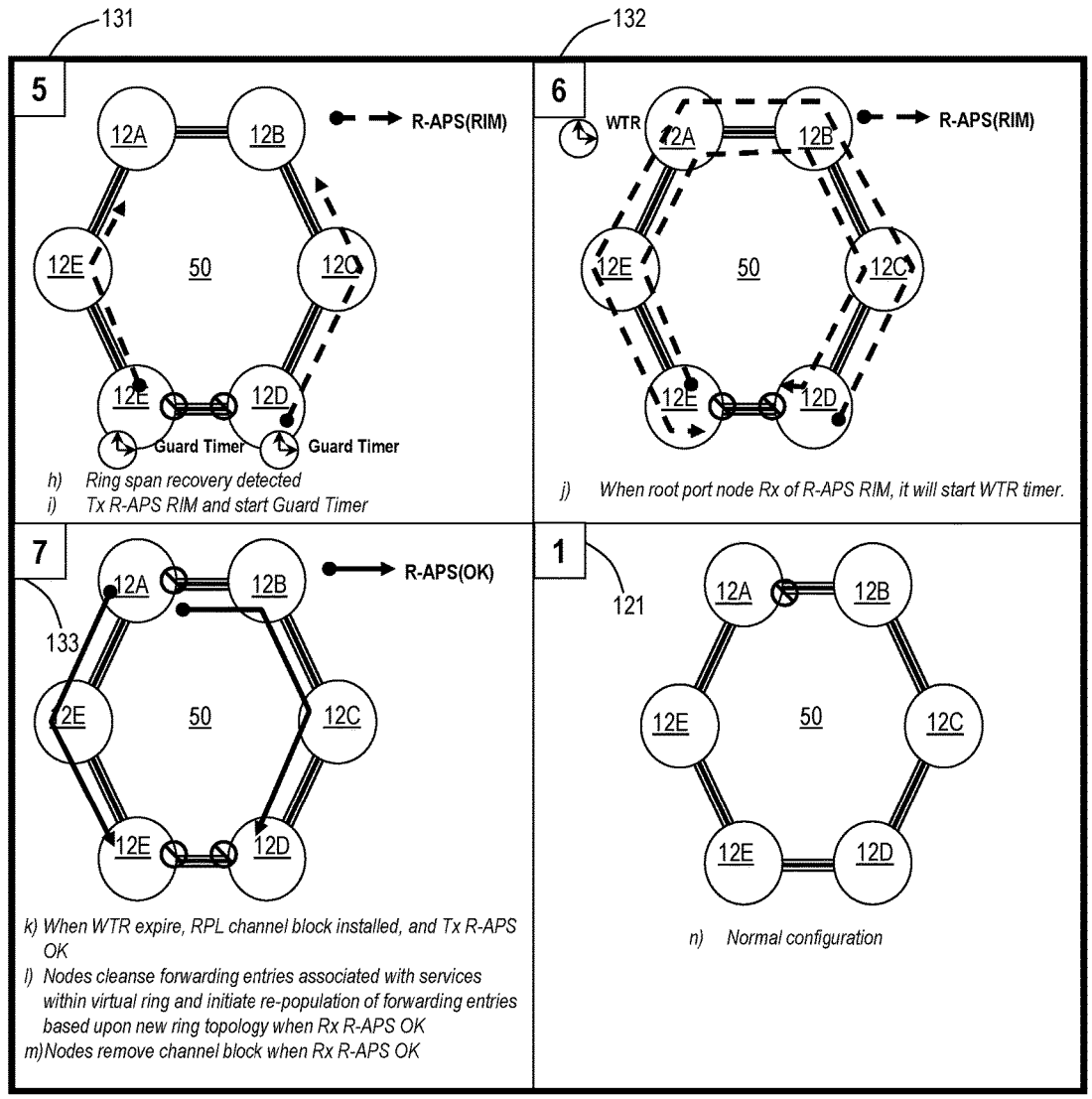
FIG. 9 is a network diagram of the ring of FIGS. 3A and 3B showing a recovery sequence using G.8032 Ethernet Ring Protection Switching with the generalized/arbitrary identification space and forwarding based on IEEE 802.1Q bridging.

Referring to FIG. 9, in an exemplary embodiment, the ring 50 with nodes 12 is illustrated showing a recovery sequence using G.8032 Ethernet Ring Protection Switching with the generalized/arbitrary identification space and forwarding based on IEEE 802.1Q bridging. The recovery sequence includes a recovery from the failure illustrated in FIG. 8 between the nodes 12D, 12E. At a point 131, a ring span recovery is detected between the nodes 12D, 12E and R-APS Recovery Indication Messages (RIM) are transmitted along with guard timers started at the nodes 12D, 12E. At a point 132, when a root port node receives the R-APS RIM, a wait-to-restore (WTR) timer is started. At a point 133, when the WTR expires, a RPL port block is installed at the nodes 12A and R-APS OK messages are transmitted. Also, each of the nodes 12 cleanses forwarding entries associated with services within the virtual ring and initiate re-population of forwarding entries based upon new ring topology when the R-APS OK messages are received. The nodes 12E, 12D remove the channel blocks also when the R-APS OK messages are received. Finally, the ring 50 is back in a normal operating condition, i.e., back to the point 121.

Figure 10A:
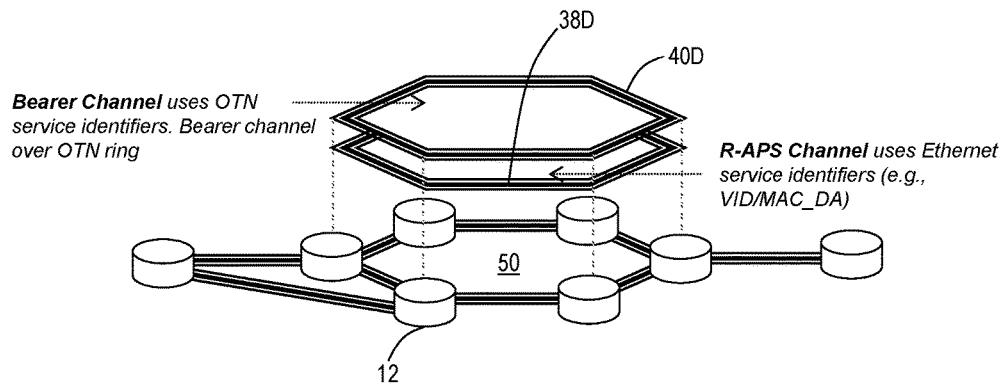
FIGS. 10A and 10B are network diagrams the ring of FIGS. 3A and 3B showing G.8032 like Ring Protection with a generalized/arbitrary identification space and forwarding based on a "non-learning" forwarding paradigm.
Figure 10B:
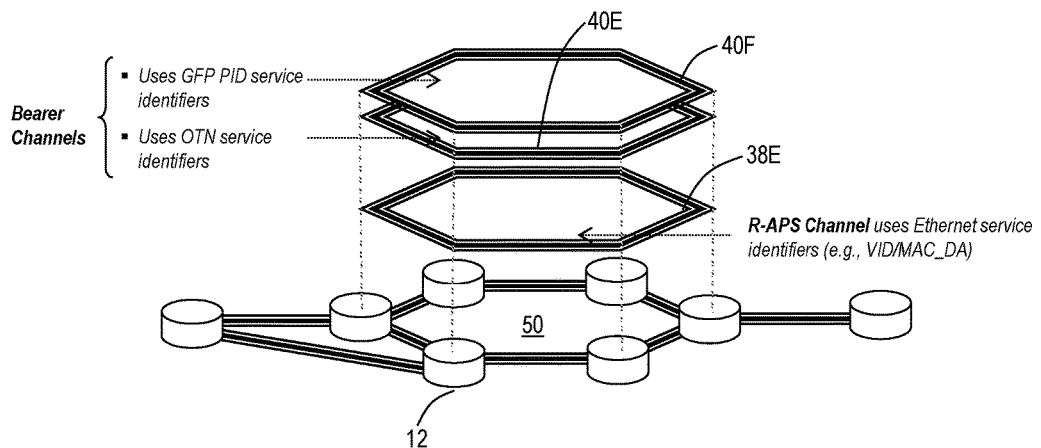

Referring to FIGS. 10A and 10B, in an exemplary embodiment, the ring 50 is illustrated with G.8032 like Ring Protection with a generalized/arbitrary identification space and forwarding based on a "non-learning" forwarding paradigm. In FIG. 10A, the ring 50 includes virtual channels 38D, 40D with the channel 38D being a R-APS channel using Ethernet service identifiers (e.g., VID/MAC DA) and the channel 40D being a bearer channel using OTN service identifiers, i.e., a bearer channel over an OTN ring. In FIG. 10B, the ring 50 includes virtual channels 38E, 40E, 40F with the channel 38E being a R-APS channel using Ethernet service identifiers (e.g., VID/MAC DA), the channel 40E being a bearer channel using OTN service identifiers, and the channel 40F being a bearer channel using GFP PID service identifiers. The R-APS protocol for bearer channels 40E and 40F is run on management channel 38E. Thus, in the examples of FIGS. 10A and 10B, the R-APS channels 38D, 38E use a different service identifier space than the bearer channels 40D, 40E, 40F. Also, note the channels 40D, 40E, 40F are illustrated with OTN service identifiers and GFP PID service identifiers for illustration purposes, and other service identifiers are also contemplated by the generalized service protection systems and methods.

The following abstractions/modifications are necessary for the generalized service protection systems and methods with forwarding based on a "non-learning" forwarding paradigm. First, service flows being transported over the ring 50 can be identified based upon any unique identifier. Exemplary unique identifiers can include PBB I-SID, Ethernet VLAN tag priority bits, MPLS label identifier, IP DSCP, EtherType value, GFP PID, a wavelength identifier, a combination of the aforementioned, and the like. Second, the generalized service protection systems and methods support blocking/unblocking of bearer and R-APS traffic channel based upon service identifier. Third, the generalized service protection systems and methods support forwarding of bearer and R-APS traffic over the ring based upon service identifier. Fourth, the generalized service protection systems and methods support separation of bearer and R-APS traffic into different instances of the same service identifier name space, or different service identifier name spaces.

Figure 11:
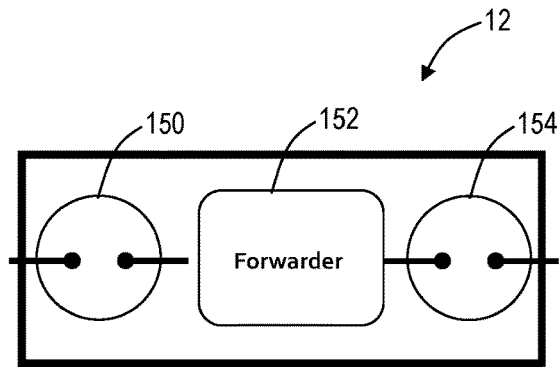
FIG. 11 is a block diagram of functions associated with the ring node for the generalized/arbitrary identification space and forwarding based on a "non-learning" forwarding paradigm.
Figure 11:
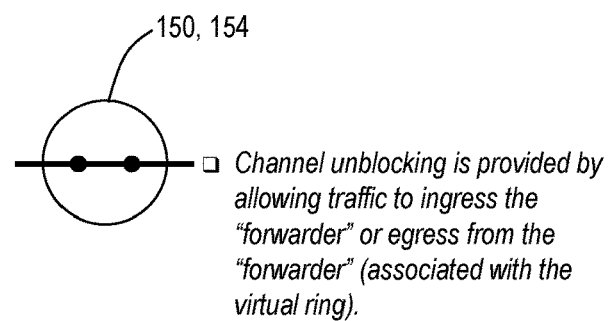
Figure 11:
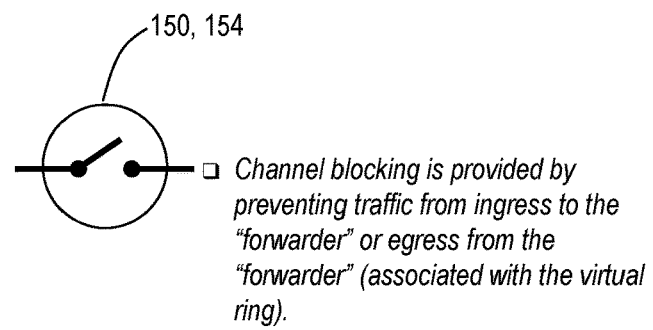

Referring to FIG. 11, in an exemplary embodiment, block diagrams illustrate functions associated with the ring node 12 for the generalized/arbitrary identification space and forwarding based on a "non-learning" forwarding paradigm. In this exemplary embodiment, the forwarding paradigm used and the blocking that is done are independent actions and entities and are decoupled. Each of the nodes 12 can be represented by a first port 150, a forwarder 152, and a second port 154. The forwarder 152 can be anything that forwards traffic between the ports 150, 152. For example, the forwarder 152 can be an optical switching device, an electrical TDM switch fabric, a packet switch fabric, etc. The ports 150, 154 ingress and egress traffic on the ring 50, and the forwarder 152 communicatively couples the ports 150, 154 therebetween. While illustrated conceptually, those of ordinary skill in the art will recognize the ports 150, 154 and forwarder 152 each includes hardware, software, and/or firmware for implementing their associated functions. Each of the ports 150, 154 includes the channel block functionality described herein. Channel unblocking is provided by allowing traffic to ingress the forwarder 152 or egress from the forwarder 152 (associated with the virtual ring). Channel blocking is provided by preventing traffic from ingress to the forwarder 152 or egress from the forwarder 152 (associated with the virtual ring). Note, the channel block 52 can be different depending on the bearer traffic. For example, for wavelengths, the channel block 52 can be a variable optical attenuator (VOA), wavelength blocker, etc. For TDM traffic, the channel block 52 can be settings in a switch fabric to terminate a TDM flow, etc.

In this exemplary embodiment of a generalized/arbitrary identification space and forwarding based on a "non-learning" forwarding paradigm, the G.8032 protocol can be abstracted to support the transport and protection of service traffic with an arbitrary service identification space. As described herein the "non-learning" forwarding paradigm can include an optical splitter, electrical TDM, a packet switch with learning disabled, and the like. Each of the foregoing has forwarding based that is non-learning in an Ethernet sense. For example, the packet switch with learning disabled effectively results in all received frames being forwarded out all egress ports associated with a service, or forwarding is configured to send packets to specific ports depending on the value of the service identifier. Similarly, an optical splitter sends all traffic split out over the output ports, an electrical TDM switch sends all traffic in connection out its egress, and the like. Non-learning can mean data is forwarded based on predetermined rules, i.e., the rules are fixed and not adjusted or learned over time. Specifically, the forwarder 152 can be configured to route, switch, send, etc. traffic between the ports 150, 154 based on the predetermined rules.

Figure 12:
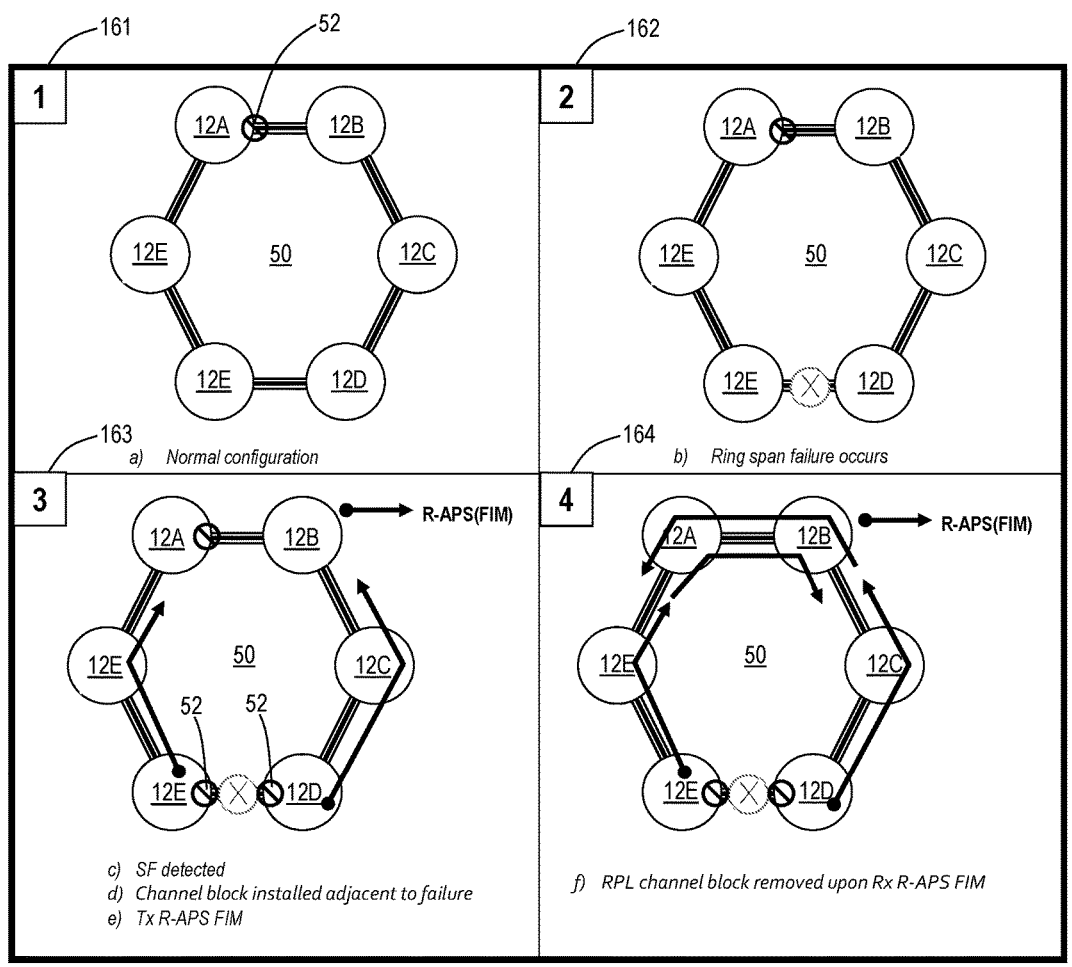
FIG. 12 is a network diagram of the ring of FIGS. 3A and 3B showing a failure sequence using G.8032 Ethernet Ring Protection Switching with the generalized/arbitrary identification space and forwarding based on a "non-learning" forwarding paradigm.

Referring to FIG. 12, in an exemplary embodiment, the ring 50 with nodes 12 is illustrated showing a failure sequence using G.8032 Ethernet Ring Protection Switching with the generalized/arbitrary identification space and forwarding based on a "non-learning" forwarding paradigm. At a first point 161 in FIG. 12, the ring 50 is operating under a normal configuration, i.e., no failures. In this example, the channel block 52 is at the node 12A facing the node 12B. As discussed herein, in the exemplary embodiment, the traffic is routed on bearer channels based on a first service identifier, and the R-APS channel on a second service identifier. Blocking occurs on both channels at the same location on the ring. At a point 162, a failure occurs on a ring span between the nodes 12E, 12D, detected via the R-APS channel. At a point 163, a signal failure (SF) is detected on the ring, a channel block is installed adjacent to the failure between the nodes 12E, 12D, and R-APS Failure Indication Messages (FIM) are transmitted from the nodes 12E, 12D. At a point 124, each of the nodes 12 will receive the R-APS FIM, and the node 12A is configured to remove its channel block upon receipt of the R-APS FIM. In this exemplary embodiment, there is no relearning since the forwarder 152 is simply forwarding traffic.

In an exemplary embodiment, the forwarding based on a "non-learning" forwarding paradigm can be described as an all-broadcast system where each node 12 is configured to broadcast everything received on one port 150 to the second port 154. The channel block 52 is meant to prevent a loop in the ring 50. That is, the all-broadcast system cannot have a loop because it will cause traffic to interfere if it loops back upon itself, i.e. whether the traffic is optical wavelengths, TDM frames, or packets. Thus, this exemplary embodiment can be viewed as placing and removing the channel block based on failures to enable recovery. That is, the activity in this exemplary embodiment is focused on the ports 150, 154, and not on the forwarder 152. The forwarder 152 does not have to flush or cleanse forwarding databases. Rather, the forwarder 152 works per normal operation under all circumstances with the channel blocks 52 being used to provide the Ring Protection Switching.

Figure 13:
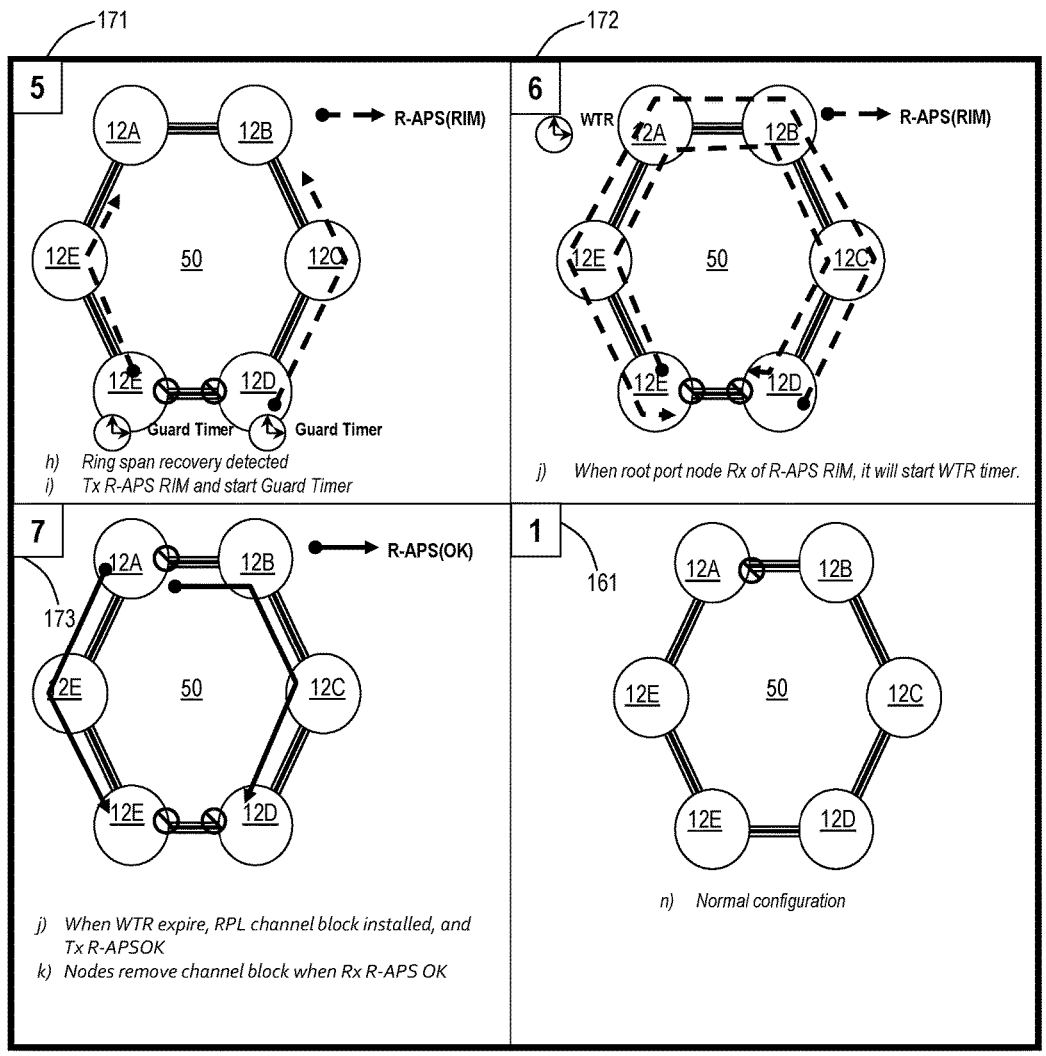
FIG. 13 is a network diagram of the ring of FIGS. 3A and 3B showing a recovery sequence using G.8032 Ethernet Ring Protection Switching with the generalized/arbitrary identification space and forwarding based on a "non-learning" forwarding paradigm.

Referring to FIG. 13, in an exemplary embodiment, the ring 50 with nodes 12 is illustrated showing a recovery sequence using G.8032 Ethernet Ring Protection Switching with the generalized/arbitrary identification space and forwarding based on a "non-learning" forwarding paradigm. The recovery sequence includes a recovery from the failure illustrated in FIG. 12 between the nodes 12D, 12E. At a point 171, a ring span recovery is detected between the nodes 12D, 12E and R-APS Recovery Indication Messages (RIM) are transmitted along with guard timers started at the nodes 12D, 12E. At a point 172, when a root port node receives the R-APS RIM, a wait-to-restore (WTR) timer is started. At a point 173, when the WTR expires, a RPL port block is installed at the nodes 12A and R-APS OK messages are transmitted. The nodes 12E, 12D are configured to remove their channel blocks upon receipt of the R-APS OK messages. Finally, the ring 50 is back in a normal operating condition, i.e., back to the point 161.

Figure 14A:
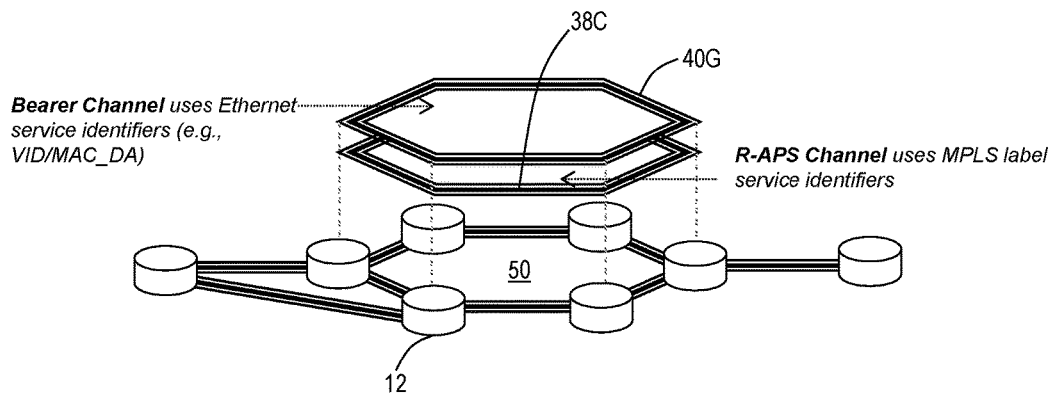
FIGS. 14A and 14B are network diagrams the ring of FIGS. 3A and 3B with G.8032 like Ring Protection with the "non-learning" forwarding paradigm utilizing Ethernet service identifiers.
Figure 14B:
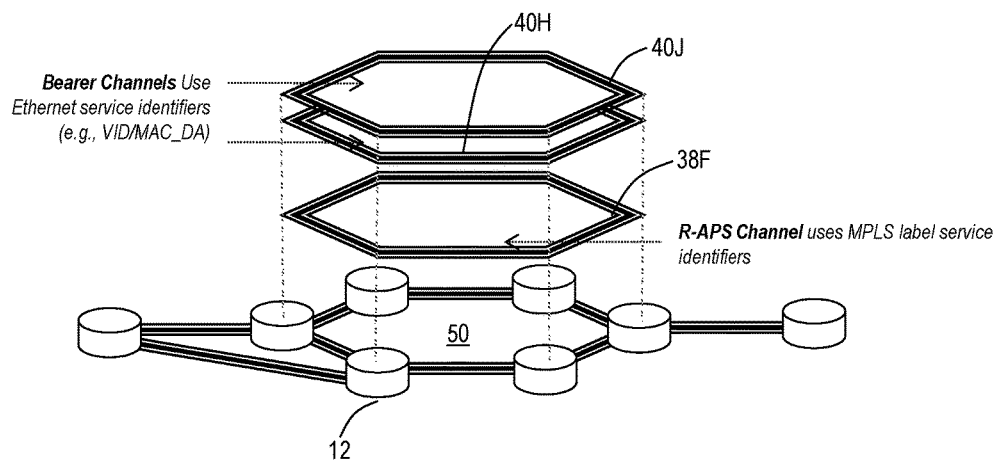

Referring to FIGS. 14A and 14B, in exemplary embodiments, the ring 50 is illustrated with G.8032 like Ring Protection with the "non-learning" forwarding paradigm utilizing Ethernet service identifiers. FIG. 14B illustrates an exemplary embodiment of the non-learning forwarding that also includes the use of Ethernet service identifiers (MAC+VID) for both a data channel and its R-APS management channel. Multiple of such data/management ring pairs can exist over the same logical ring topology. Multiple data channels, each using Ethernet service identifiers (MAC+VID) can be supported over the same logical ring with one R-APS management channel also using Ethernet service identifiers (MAC+VID), with non-learning forwarding for all virtual rings, as is illustrated in FIG. 14B.

Figure 15:
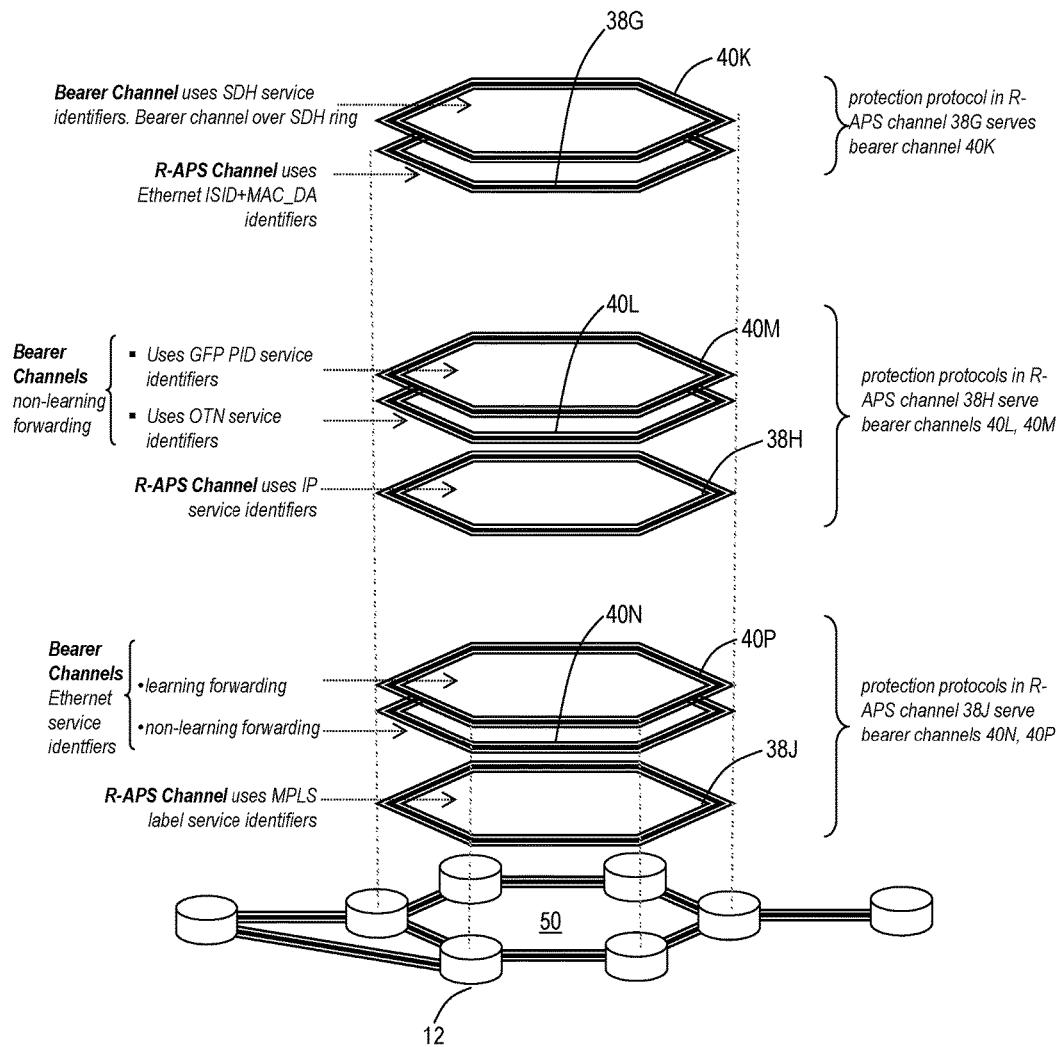
FIG. 15 is a network diagram of the ring of FIGS. 3A and 3B showing the use of generalized/arbitrary identification space to the data and management channels, plus learning and non-learning forwarding, plus multiple sets of virtual rings all over the same logical ring.

Referring to FIG. 15, in an exemplary embodiment, the ring 50 is illustrated combining the use of generalized/arbitrary identification space to the data and management channels, plus learning and non-learning forwarding, plus multiple sets of virtual rings all over the same logical ring. Here, three sets of virtual rings, each with their own R-APS management channel are configured over the same logical ring of nodes 12. Virtual rings 40K and 38G show service identification spaces that are not MAC+VID (as in G.8032) and are in a 1:1 management:data channel relationship. Virtual rings 40L, 40M and 38H show service identification spaces that are not MAC+VID (as in G.8032) and are in a 1:n management:data channel relationship. Virtual rings 40N and 40P show a mix of learning and non-learning forwarding while sharing the same R-APS management channel 38J.

Figure 16:
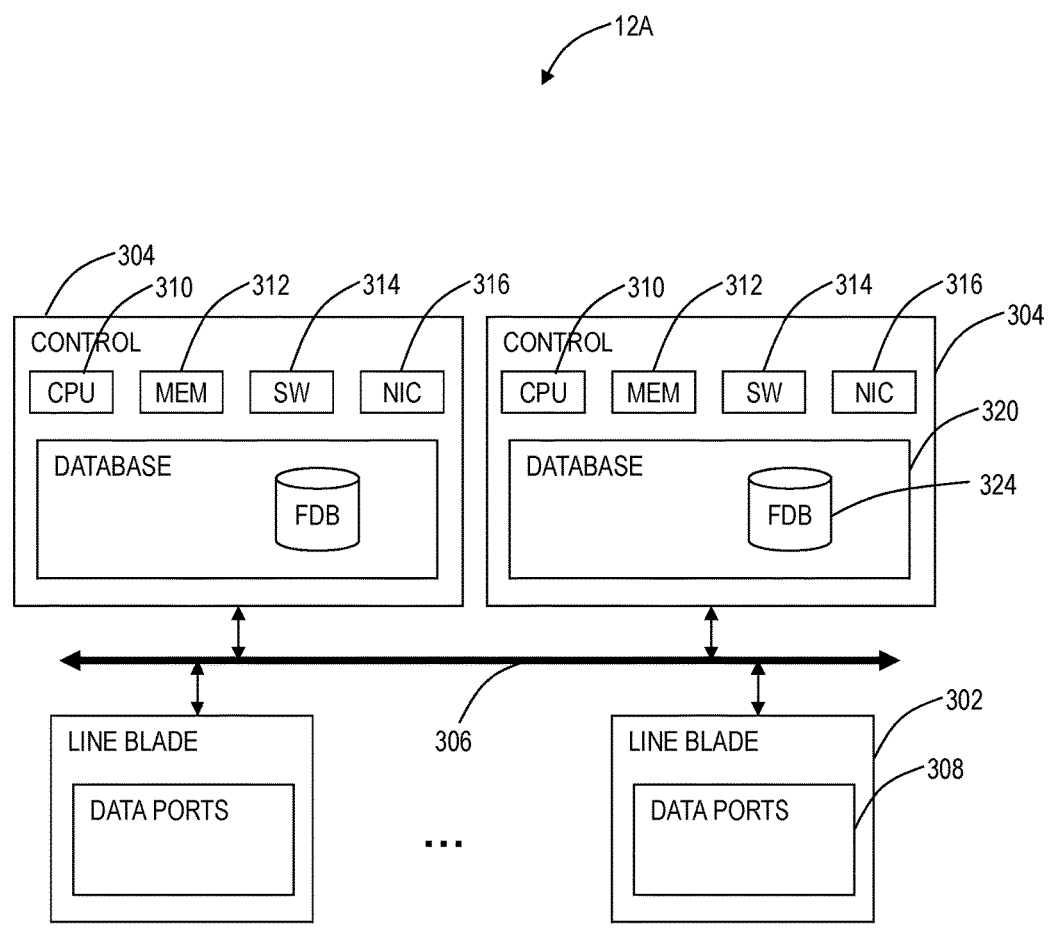
FIG. 16 is a block diagram illustrates an exemplary implementation of a node for use in the various rings.

Referring to FIG. 16, in an exemplary embodiment, a block diagram illustrates an exemplary implementation of the node 12A. In this exemplary embodiment, the node 12A is an Ethernet network switch, but those of ordinary skill in the art will recognize the generalized service protection systems and methods, contemplate other types of network elements and other implementations. For example, the Ethernet network switch can be used with the G.8032 like Ring Protection with a generalized/arbitrary identification space and forwarding based on IEEE 802.1Q bridging. In this exemplary embodiment, the node 12A includes a plurality of blades 302, 304 interconnected via an interface 306. The blades 302, 304 are also known as line cards, line modules, circuit packs, pluggable modules, etc. and generally refer to components mounted within a chassis, shelf, etc. of a data switching device, i.e., the node 12A. In another exemplary embodiment, the functionality of each of the blades 302, 304 can be integrated within a single module, such as in the layer two switch integrated within an optical network element. Each of the blades 302, 304 can include numerous electronic devices and optical devices mounted on a circuit board along with various interconnects including interfaces to the chassis, shelf, etc.

Two exemplary blades are illustrated with line blades 302 and control blades 304. The line blades 302 generally include data ports 308 such as a plurality of Ethernet ports. For example, the line blade 302 can include a plurality of physical ports disposed on an exterior of the blade 302 for receiving ingress/egress connections. Additionally, the line blades 302 can include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the node 12A out by the correct port 308 to the next node 12. "Switching fabric" includes switching units, or individual boxes, in a node; integrated circuits contained in the switching units; and programming that allows switching paths to be controlled. Note, the switching fabric can be distributed on the blades 302, 304, in a separate blade (not shown), or a combination thereof.

Within the context of the generalized service protection systems and methods, the control blades 304 include a microprocessor 310, memory 312, software 314, and a network interface 316. Specifically, the microprocessor 310, the memory 312, and the software 314 can collectively control, configure, provision, monitor, etc. the node 12A. The network interface 316 may be utilized to communicate with an element manager, a network management system, etc. Additionally, the control blades 304 can include a database 320 that tracks and maintains provisioning, configuration, operational data and the like. The database 320 can include a forwarding database (FDB) 322 that is adjusted as described herein. In this exemplary embodiment, the node 12A includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 12A. In an exemplary embodiment, the blades 302, 304 are configured to implement a G.8032 ring, such as the ring 50, and to implement the various processes, algorithms, methods, mechanisms, etc. described herein for implementing G.8032 like Ring Protection with a generalized/arbitrary identification space and forwarding based on IEEE 802.1Q bridging or forwarding based on a "non-learning" forwarding paradigm.

Figure 17:
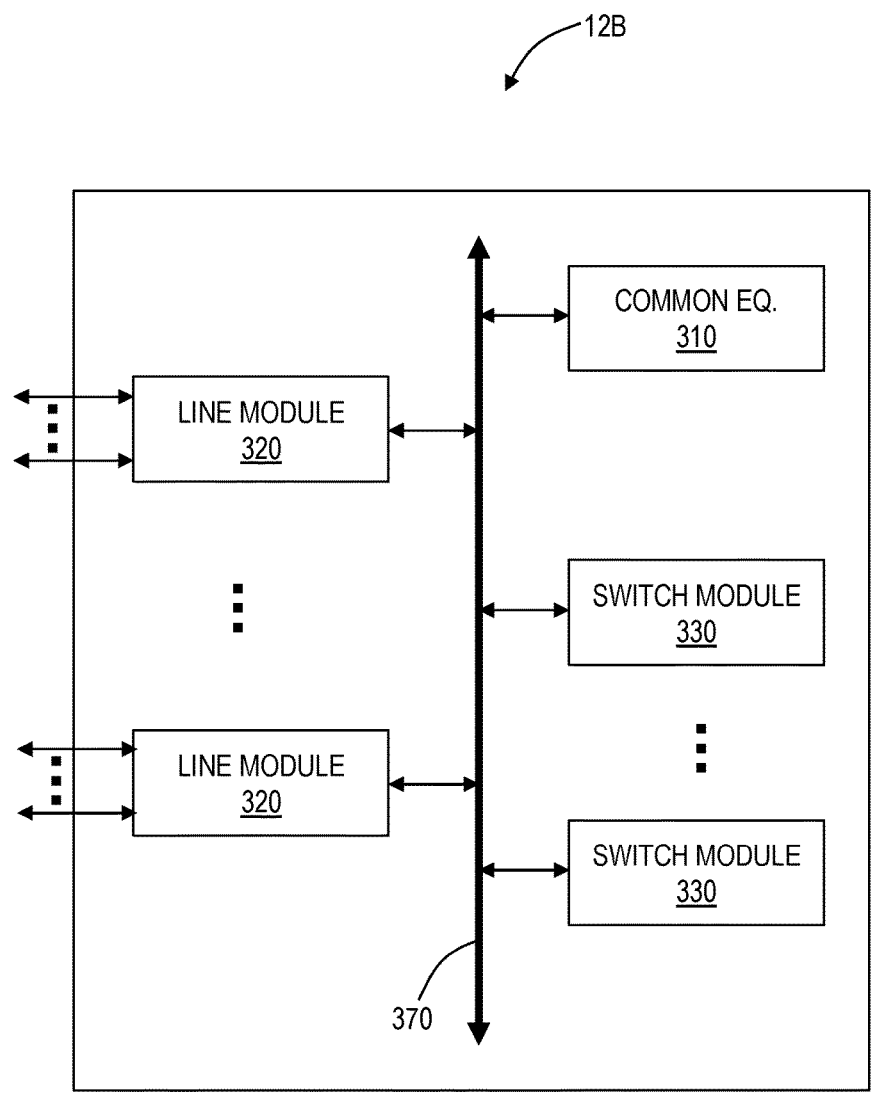
FIG. 17 is a block diagram illustrates another exemplary implementation of a node for use in the various rings.

Referring to FIG. 17, in an exemplary embodiment, a block diagram illustrates an exemplary implementation of the node 12B. For example, the node 12B can be used with the G.8032 like Ring Protection with a generalized/arbitrary identification space and forwarding based on a "non-learning" forwarding paradigm. In an exemplary embodiment, the node 12B can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 12B can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, a private branch exchange (PBX), etc. That is, the node 12B can be any system with ingress and egress signals and switching therebetween of channels, timeslots, tributary units, wavelengths, etc. While the node 12B is generally shown as an optical network element, the generalized service protection systems and methods are contemplated for use with any switching fabric, network element, or network based thereon.

In an exemplary embodiment, the node 12B includes common equipment 310, one or more line modules 320, and one or more switch modules 330. The common equipment 310 can include power; a control module; operations, administration, maintenance, and provisioning (OAM&P) access; and the like. The common equipment 310 can connect to a management system such as a network management system (NMS), element management system (EMS), or the like. The node 12B can include an interface 370 for communicatively coupling the common equipment 310, the line modules 320, and the switch modules 330 therebetween. For example, the interface 370 can be a backplane, midplane, a bus, optical or electrical connectors, or the like. The line modules 320 are configured to provide ingress and egress to the switch modules 330 and external to the node 12B. In an exemplary embodiment, the line modules 320 can form ingress and egress switches with the switch modules 330 as center stage switches for a three-stage switch, e.g., a three stage Clos switch. The line modules 320 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. The line modules 320 can also be all-optical ports for interface to an all-optical switch module 330.

Further, the line modules 320 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 320 can include wavelength division multiplexing interfaces, short reach interfaces, and the like, and can connect to other line modules 320 on remote network elements, end clients, edge routers, and the like. From a logical perspective, the line modules 320 provide ingress and egress ports to the node 12B, and each line module 320 can include one or more physical ports. The switch modules 330 are configured to switch channels, timeslots, tributary units, wavelengths, etc. between the line modules 320. For example, the switch modules 330 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 330 can include redundancy as well, such as 1:1, 1:N, etc.

Those of ordinary skill in the art will recognize the nodes 12A, 12B can include other components which are omitted for illustration purposes, and that the systems and methods described herein are contemplated for use with a plurality of different nodes with the nodes 12A, 12B presented as an exemplary type of node. For example, in another exemplary embodiment, a node may not include the switch modules 330, but rather have the corresponding functionality in the line modules 320 (or some equivalent) in a distributed fashion. For the nodes 12A, 12B, other architectures providing ingress, egress, and switching therebetween are also contemplated for the systems and methods described herein. In general, the systems and methods described herein contemplate use with any node providing switching or forwarding of channels, timeslots, tributary units, wavelengths, etc.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured to," "circuitry adapted to," "logic configured to," "logic adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for ring protection switching in a network based on selectively blocking and unblocking a port, the method comprising:
   forwarding traffic via the port over a data channel that utilizes a first service identifier, wherein the data channel is routed in the network along a closed loop;
   operating a management channel that utilizes a second service identifier that is a different type from the first service identifier; and
   selectively blocking and unblocking traffic including both the data channel and the management channel on the port to provide the ring protection switching over the closed loop based on the management channel such that G.8032 protection is performed on the data channel that is one of, for the closed loop, Optical Transport Network (OTN) traffic, Synchronous Optical Network (SONET)/Synchronous Digital Hierarchy (SDH) traffic, Multiprotocol Label Switching (MPLS) traffic, and Internet Protocol (IP) traffic.

2. The method of claim 1, wherein the forwarding traffic and the selectively blocking and unblocking traffic are independent actions, with associated entities configured to perform the forwarding traffic and the selectively blocking and unblocking traffic being decoupled from one another.

3. The method of claim 1, wherein the first service identifier is not either of a Virtual Local Area Network (VLAN) Identifier (VID) and a Destination Media Access Control (MAC DA).

4. The method of claim 1, wherein the second service identifier is an Ethernet service identifier and the first service identifier is not an Ethernet service identifier.

5. The method of claim 1, wherein the first service identifier is a Time Division Multiplexing (TDM) bearer traffic identifier, and wherein the selectively blocking and unblocking traffic is performed in a switch fabric.

6. The method of claim 1, wherein the data channel is a wavelength, and wherein the selectively blocking and unblocking traffic is performed by an optical routing device.

7. The method of claim 1, wherein the selectively blocking and unblocking traffic is performed responsive to detecting a fault in the management channel.

8. An apparatus configured to perform ring protection switching in a network based on selectively blocking and unblocking a port, the node comprising:
   circuitry adapted to forward traffic via the port over a data channel that utilizes a first service identifier, wherein the data channel is routed in the network along a closed loop;

circuitry adapted to operate a management channel that utilizes a second service identifier that is a different type from the first service identifier; and circuitry adapted to selectively block and unblock traffic including both the data channel and the management channel on the port to provide the ring protection switching over the closed loop based on the management channel such that G.8032 protection is performed on the data channel that is one of, for the closed loop, Optical Transport Network (OTN) traffic, Synchronous Optical Network (SONET)/Synchronous Digital Hierarchy (SDH) traffic, Multiprotocol Label Switching (MPLS) traffic, and Internet Protocol (IP) traffic.

9. The apparatus of claim 8, wherein the forward of the traffic and the block and unblock of the traffic are independent actions, with the circuitry adapted to forward traffic and the circuitry adapted to selectively block and unblock traffic being decoupled from one another.

10. The apparatus of claim 8, wherein the first service identifier is not either of a Virtual Local Area Network (VLAN) Identifier (VID) and a Destination Media Access Control (MAC DA).

11. The apparatus of claim 8, wherein the second service identifier is an Ethernet service identifier and the first service identifier is not an Ethernet service identifier.

12. The apparatus of claim 8, wherein the first service identifier is a Time Division Multiplexing (TDM) bearer traffic identifier, and wherein the traffic is selectively blocked and unblocked in a switch fabric.

13. The apparatus of claim 8, wherein the data channel is a wavelength, and wherein the traffic is selectively blocked and unblocked by an optical routing device.

14. The apparatus of claim 8, wherein the traffic is selectively blocked and unblocked responsive to detecting a fault in the management channel.

15. A node configured to perform ring protection switching in a network based on selectively blocking and unblocking a port, the node comprising:

at least one port adapted to forward traffic over a data channel that utilizes a first service identifier and adapted to operate a management channel that utilizes a second service identifier that is a different type from the first service identifier, wherein the data channel is routed in the network along a closed loop; and a device adapted to selectively block and unblock traffic including both the data channel and the management channel on the port to provide the ring protection switching over the closed loop based on the management channel such that G.8032 protection is performed on the data channel that is one of, for the closed loop, Optical Transport Network (OTN) traffic, Synchronous Optical Network (SONET)/Synchronous Digital Hierarchy (SDH) traffic, Multiprotocol Label Switching (MPLS) traffic, and Internet Protocol (IP) traffic.

16. The node of claim 15, wherein the forward of the traffic and the block and unblock of the traffic are independent actions, with associated entities configured to perform the independent actions being decoupled from one another.

17. The node of claim 15, wherein the first service identifier is not either of a Virtual Local Area Network (VLAN) Identifier (VID) and a Destination Media Access Control (MAC DA).

18. The node of claim 15, wherein the second service identifier is an Ethernet service identifier and the first service identifier is not an Ethernet service identifier.

19. The node of claim 15, wherein the first service identifier is a Time Division Multiplexing (TDM) bearer traffic identifier, and wherein the traffic is selectively blocked and unblocked in a switch fabric.

20. The node of claim 15, wherein the data channel is a wavelength, and wherein the traffic is selectively blocked and unblocked by an optical routing device.

* * * * *